US012096180B2

(12) United States Patent
LaCourt et al.

(10) Patent No.: US 12,096,180 B2
(45) Date of Patent: Sep. 17, 2024

(54) AUDIO SIGNAL TRANSMISSION WITH DYNAMIC SOURCE AND TARGET POSITIONS IN A VEHICLE

(71) Applicant: GM GLOBAL TECHNOLOGY OPERATIONS LLC, Detroit, MI (US)

(72) Inventors: Cameron G. LaCourt, Royal Oak, MI (US); Tyler C. Hanson, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 17/980,628

(22) Filed: Nov. 4, 2022

(65) Prior Publication Data

US 2024/0155285 A1 May 9, 2024

(51) Int. Cl.

| | |
|---|---|
| ***H04R 1/32*** | (2006.01) |
| ***H04R 1/02*** | (2006.01) |
| ***H04R 5/02*** | (2006.01) |
| ***H04S 7/00*** | (2006.01) |

(52) U.S. Cl.

CPC ............ *H04R 1/323* (2013.01); *H04R 1/025* (2013.01); *H04R 5/023* (2013.01); *H04S 7/303* (2013.01); *H04R 2201/025* (2013.01); *H04R 2499/13* (2013.01); *H04S 2400/11* (2013.01); *H04S 2420/01* (2013.01)

(58) Field of Classification Search

CPC ........ H04R 1/323; H04R 1/025; H04R 5/023; H04R 2201/025; H04R 2499/13; H04S 7/303; H04S 2400/11; H04S 2420/01; H04S 7/302

See application file for complete search history.

(56) References Cited

U.S. PATENT DOCUMENTS

| | | | |
|---|---|---|---|
| 2021/0303255 A1* | 9/2021 | Noguchi | B62J 3/10 |
| 2022/0159396 A1* | 5/2022 | Fryer | H04S 7/30 |

* cited by examiner

*Primary Examiner* — Tuan D Nguyen
(74) *Attorney, Agent, or Firm* — Quinn IP Law

(57) ABSTRACT

A system for transmitting an audio signal in a vehicle includes a stabilizer located at a source position in the vehicle. At least one speaker is operatively connected to the stabilizer. The speaker is adapted to transmit an audio signal to a target position for at least partially supporting a spatial audio representation. The target position and the source position are independently movable. The stabilizer is adapted to direct the audio signal such that a trajectory between the target position and the source position is maintained regardless of respective motion of the target position and the source position. The trajectory includes a first segment between the source position and a deflecting surface and a second segment between the deflecting surface and the target position.

20 Claims, 4 Drawing Sheets

AUDIO SIGNAL TRANSMISSION WITH DYNAMIC SOURCE AND TARGET POSITIONS IN A VEHICLE

INTRODUCTION

The present disclosure relates generally to transmission of an audio signal in a vehicle. More specifically, the disclosure relates to transmitting the audio signal from a movable source position to a movable target position in a vehicle. It is an undeniable facet of modern life that many people spend a considerable amount of time in their vehicles, while being transported from one place to another. Many consumers listen to various audio recordings, hear vehicle signals or chimes and receive calls through their vehicle's audio system. The expectations of sound quality within a vehicle have increased for many consumers. However, the audio quality may be compromised at times due to various factors.

SUMMARY

Disclosed herein is a system for transmitting an audio signal in a vehicle. The system includes a stabilizer located at a source position in the vehicle. At least one speaker is operatively connected to the stabilizer. The speaker is adapted to transmit an audio signal to a target position for at least partially supporting a spatial audio representation. The spatial audio representation may provide a listener with a three-dimensional listening experience. The target position and the source position are independently movable. The stabilizer is adapted to direct the audio signal such that a trajectory between the target position and the source position is maintained regardless of respective motion of the target position and the source position. The trajectory includes a first segment between the source position and a deflecting surface and a second segment between the deflecting surface and the target position.

The system may include a controller adapted to identify the target position via execution of an occupant monitoring algorithm. The controller has a processor and tangible, non-transitory memory on which instructions are recorded. The controller may be adapted to determine respective range of motion envelopes for the source position and the target position. The stabilizer may be oriented to connect the source position and the target position based on a respective calibrated position of the source position and the target position in the respective range of motion envelopes.

In some embodiments, the source position is located in a vehicle seat. The vehicle seat may include a head restraint, the source position being in the head restraint. In some embodiments, the deflecting surface is a roof of the vehicle. The deflecting surface may be a window of the vehicle. The deflecting surface may be at least partially composed of glass.

In some embodiments, the stabilizer is a three-axis gimbal adapted to counteract motion in three directions. The three-axis gimbal includes a frame, a plurality of motors and a mounting plate for attachment to the at least one speaker. The three-axis gimbal may include one or more vibration ball dampeners adapted to absorb shock along the three directions.

Disclosed herein is a method of transmitting an audio signal in a vehicle. The method includes operatively connecting at least one speaker to a stabilizer, with the stabilizer being placed at a source position in the vehicle. The speaker is adapted to transmit an audio signal for supporting a spatial audio representation. The method includes identifying a target position for receiving the audio signal, the target position and the source position being independently movable, the stabilizer being adapted to direct the audio signal towards the target position such that a trajectory between the target position and the source position is maintained regardless of respective motion of the target position and the source position. The method includes devising the trajectory to include a first segment between the source position and a deflecting surface and a second segment between the deflecting surface and the target position.

The above features and advantages and other features and advantages of the present disclosure are readily apparent from the following detailed description of the best modes for carrying out the disclosure when taken in connection with the accompanying drawings.

Figure 1:
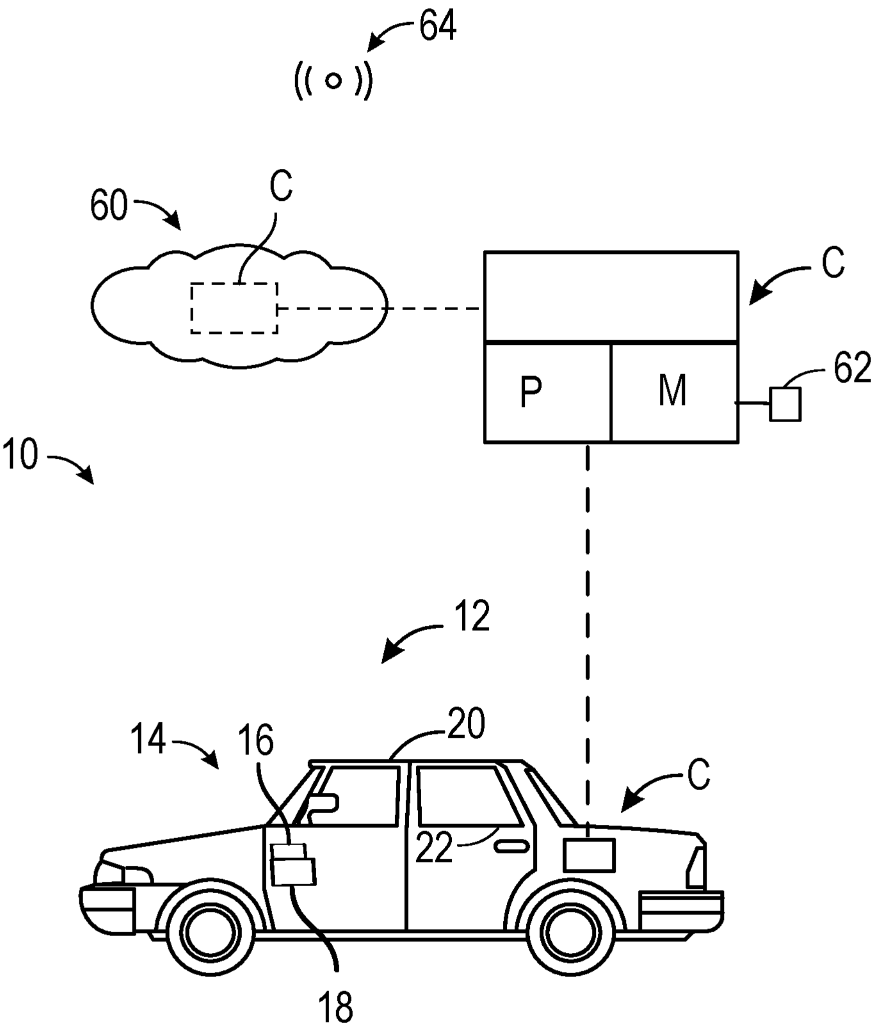
FIG. 1 is a schematic fragmentary diagram of a system for transmitting an audio signal in a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
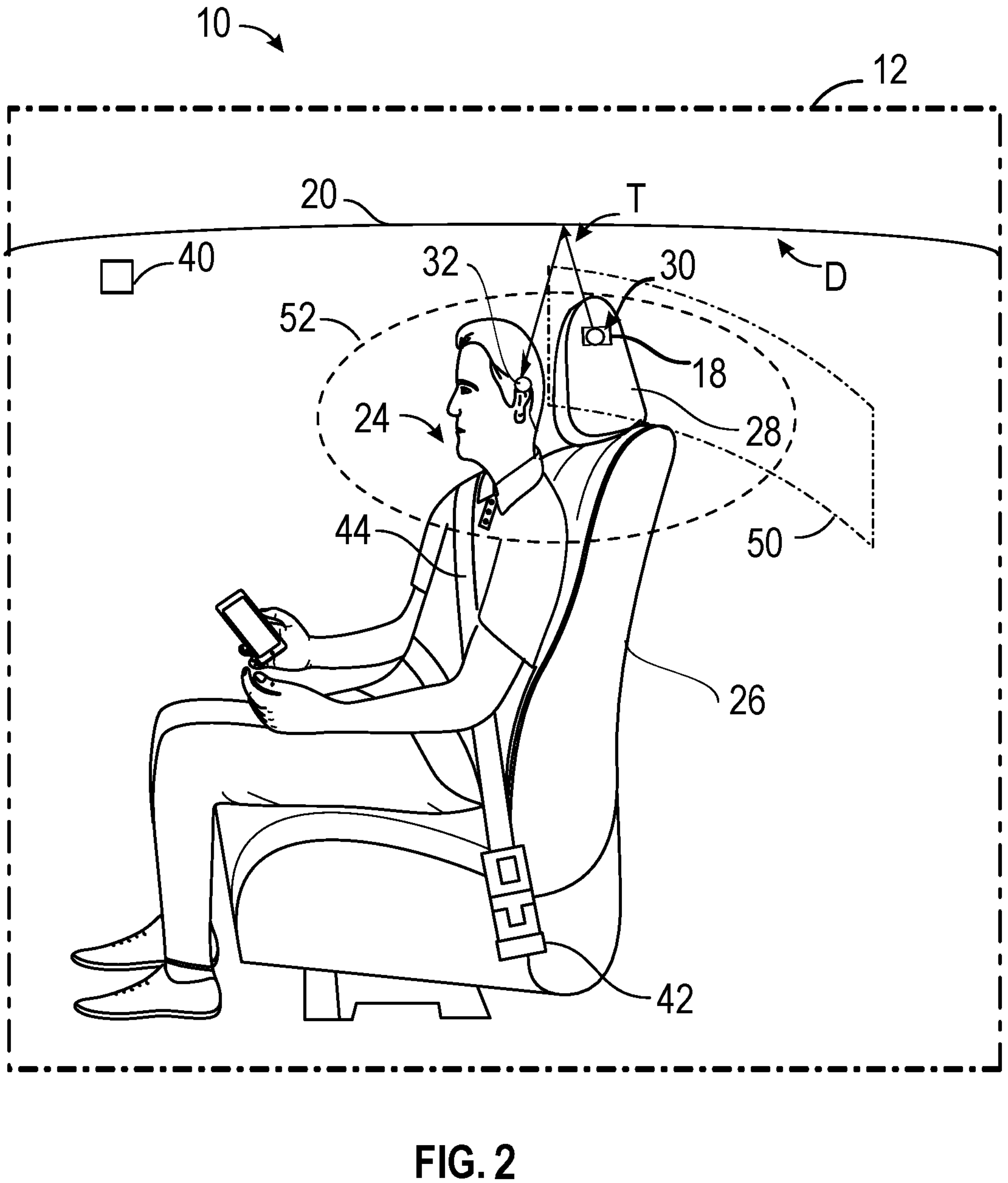
FIG. 2 is a schematic fragmentary diagram of an occupant in the vehicle of FIG. 1, depicting source and target positions.

Referring to the drawings, wherein like reference numbers refer to like components, FIGS. 1-2 schematically illustrate a system 10 for transmitting an audio signal in a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components. It is understood that the FIGS. are not drawn to scale.

Referring to FIG. 1, the vehicle 12 includes an audio unit 14 with at least one speaker 16 capable of transmitting an audio signal. The speaker 16 is operatively connected to or mounted on a stabilizer 18. The audio unit 14 may include a microphone (not shown) and other accessories. The speaker 16 may be an analog speaker, a digital speaker, a combination of the two or other type of speaker available to those skilled in the art. The types of audio signals broadcasted by the speaker 16 may include, but are not limited to, chimes (e.g., from seatbelt sensors alerting to an unbuckled state), click-clacks (e.g., from the hazard lights being activated), beeping sounds (e.g., from a lane departure warning module), ringtone from an incoming voice call, car theft alarm, transmission from radio (AM, FM and satellite), compact disc, DVD and other types of media. The audio signal broadcasted through the speaker 16 may be a live call from a remote advisor (e.g., OnStar™). The location of the speaker 16 in the vehicle 12 may be varied.

To enable a three-dimensional experience as a listener, a speaker is generally positioned in the place where the sound is being transmitted from. However, this may not be possible in constrained spaces such as motor vehicles. Many vehicles have limited packaging space for storing audio equipment. For example, a vehicle 12 may have a fixed glass roof with no packaging space for overhead speakers.

FIG. 2 shows an occupant 24 seated on a vehicle seat 26 in the vehicle 12. The system 10 enables a spatial audio representation by providing the occupant 24 with a three-dimensional listening experience. With the spatial audio representation, sound waves appear to the occupant 24 to emanate from a three-dimensional point in space (e.g., above, below, behind, or next to the occupant 24 etc.). The audio signals are delivered to a changing target location through the use of the stabilizer 18. While the sound generated by the speaker 16 may be similar to that of a regular speaker available to those skilled in the art, the occupant 24 obtains a three-dimensional listening experience based on the strategic placement of the speaker 16 and the trajectory of the audio signal.

As described below and referring to FIG. 2, a stabilizer 18 is placed in a moveable object (at a source position 30) in the vehicle 12. The speaker 16 is mounted on the stabilizer 18 and emits an audio signal that is deflected (via deflecting surface D) to a target position 32, which is relatively close to the occupant 24. The deflecting surface D may be a roof 20 (see FIGS. 1-2) of the vehicle 12. The roof 20 may be represented by the ceiling of the vehicle cabin or a panel on the underside of the ceiling. The deflecting surface D may be a window 22 (see FIG. 1) of the vehicle 12. The window 22 may be a side window, front window or rear window. The stabilizer 18 directs the audio signal such that a trajectory T between the target position 32 and the source position 30 is maintained regardless of respective motion of the target position 32 and the source position 30. The target position 32 and the source position 30 are independently movable.

Figure 4:
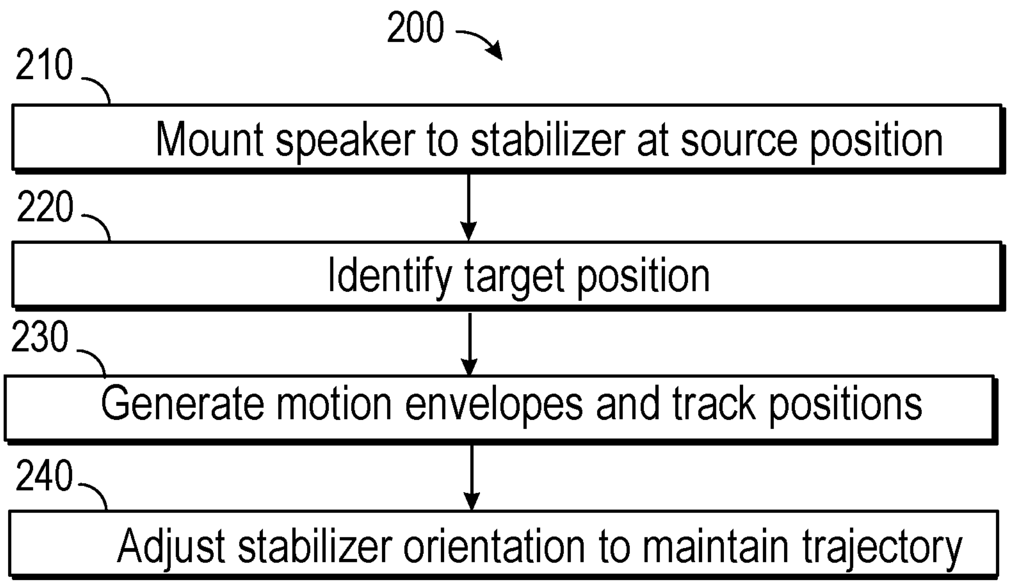
FIG. 4 is a flowchart for a method of transmitting an audio signal from a non-stationary position in a vehicle.

Referring now to FIG. 4, a flowchart of an example method 200 of operating the system 10 is shown. Method 200 need not be applied in the specific order recited herein. Furthermore, it is to be understood that some blocks may be eliminated. In some embodiments, method 200 may be embodied as computer-readable code or stored instructions and may be at least partially executable by the controller C.

Beginning at block 210 of FIG. 4, the method 200 includes selecting a source position 30. In the embodiment shown in FIG. 2, the source position 30 is selected to be in the vehicle seat 26. More specifically, the source position 30 is selected to be in the head restraint 28 of the vehicle seat 26. The speaker 16 is mounted on (or otherwise operatively connected to) the stabilizer 18 and placed at the source position 30.

Figure 3:
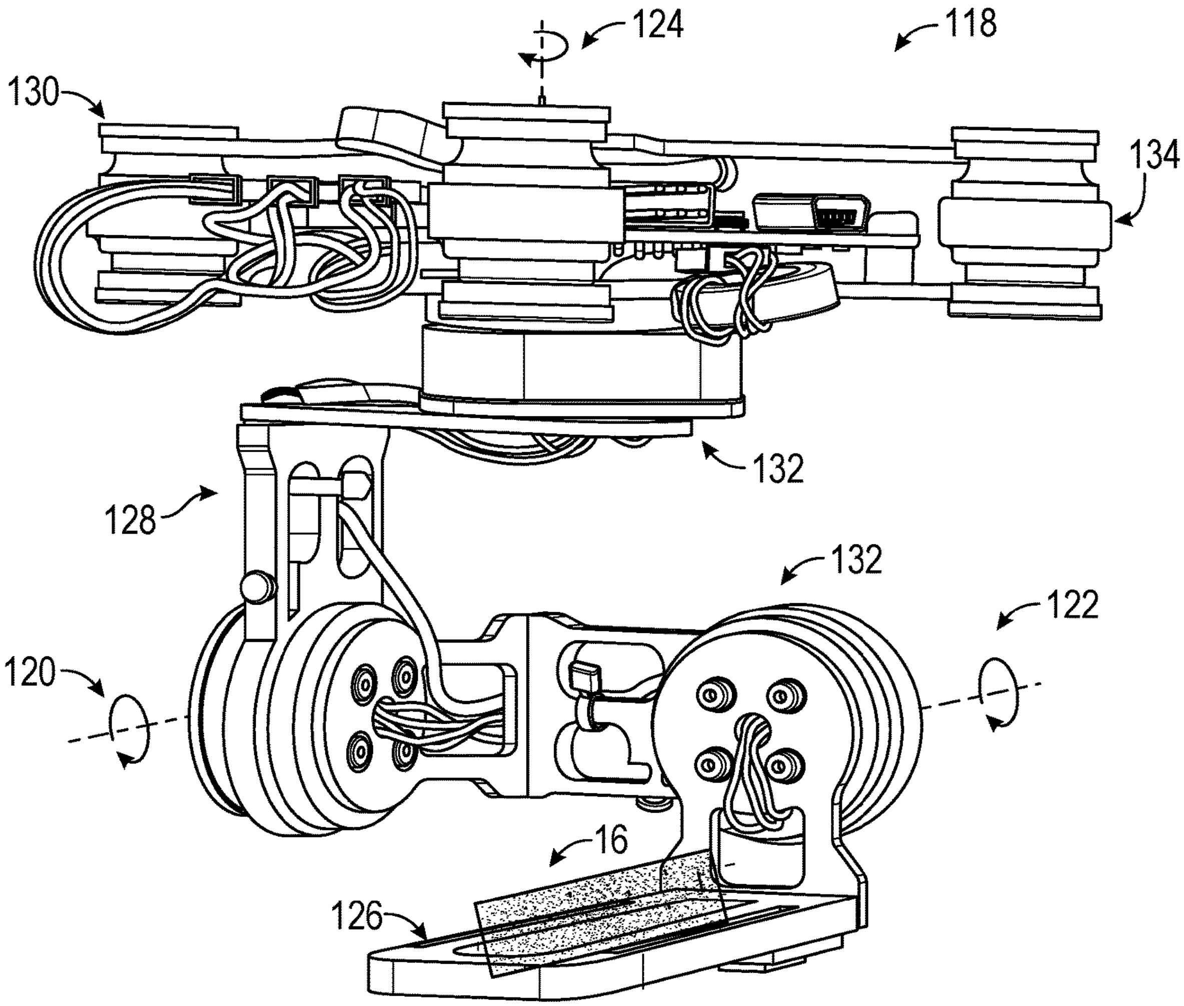
FIG. 3 is a schematic fragmentary diagram of an example stabilizer that may be employed in the system of FIG. 1.

The stabilizer 18 may be a gimbal device 118, an example of which is shown in FIG. 3. It is understood that other types of stabilizing devices may be employed. The gimbal device 118 is a three-axis pivoted support system with a set of three sub-gimbals, one mounted on the other with orthogonal pivot axes. Referring to FIG. 3, the gimbal device 118 is adapted to counteract motion in three directions: pitch 120 (left, right), roll 122 (forwards, backwards) and yaw 124 (up, down).

Referring to FIG. 3, the speaker 16 is mounted on a speaker mounting plate 126 attached to a gimbal frame 128. This results in a dynamic packaging location for the speaker 16. The three-axis gimbal 118 may be attached to the vehicle 12 through a gimbal mounting plate 130. The gimbal device 118 may include an inertial measurement unit for responding to movement, along with three brushless servo motors 132 to stabilize the speaker 16. A set of vibration ball dampeners 134 may be employed for shock absorption, via the gimbal mounting plate 130.

Advancing to block 220, the method 200 includes identifying a target position 32 for receiving the audio signal, based on occupant location in the vehicle 12. The target position 32 and the source position 30 are independently movable. A controller C may be adapted to identify the target position 32 via execution of an occupant monitoring algorithm. For example, the controller C may use data from an interior camera 40, along with facial recognition software and spatial object tracking available to those skilled in the art, to identify auditory listening zones of the occupant 24. The target position 32 may be selected to be relatively close to the ears of the occupant 24.

The controller C has at least one processor P and at least one memory M (or non-transitory, tangible computer readable storage medium) on which instructions may be recorded. The memory M may store controller-executable instruction sets, and the processor P may execute the controller-executable instruction sets stored in the memory M.

In some embodiments, the respective locations of the occupants of the vehicle 12 may be obtained through the use of seatbelt sensors. For example, the vehicle seat 26 of FIG. 2 may be equipped with a seatbelt sensor 42 which detects the seatbelt buckling status of the seatbelt 44. If the seatbelt sensor 42 indicates a buckled status, this may be taken as confirmation that the vehicle seat 26 has an occupant 24 seated on it.

Proceeding to block 230, the method 200 includes generating respective range of motion envelopes, including a first motion envelope 50 for the source position 30 and a second motion envelope 52 for target position 32, shown in FIG. 2. As the vehicle 12 moves, both the head restraint 28 and the occupant 24 may move, thus moving the source and target positions 30, 32. The first motion envelope 50 and the second motion envelope 52 represent the range of travel or three-dimensional space in which movement is possible for the source and target positions 30, 32.

Figure 5:
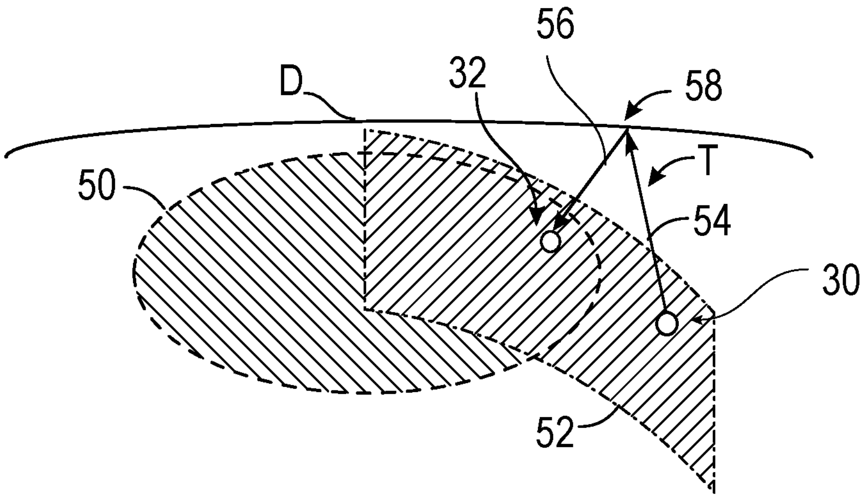
FIG. 5 is a schematic fragmentary diagram illustrating motion envelopes for the source and target positions of FIG. 2.

FIG. 5 is a schematic fragmentary diagram showing the first motion envelope 50 and the second motion envelope 52, with the source position 30 and the target position 32 having moved over time. The system 10 tracks movement over time of both the source position 30 and the target position 32 in space and adjusts the orientation of the gimbal 118 (based on the calibration) to connect the source position 30 and the target position 32 via a trajectory T (see FIGS. 2 and 5). Each possible location of the source position 30 and the target position 32 is tracked to determine the corresponding orientation of the gimbal 118.

Advancing to block 240, the method 200 includes adjusting the stabilizer 18 (thereby adjusting the orientation of the directional audio) to maintain a trajectory between the source position 30 and the target position 32, based on the respective calibrated position (from block 230) of the source position 30 and the target position 32. This allows constant connection from the source position 30 to the target position 32 for the transmission of audio, resulting in a consistent spatial audio experience for the occupant 24. The orientation of the stabilizer 18 may be controlled via the controller C. The stabilizer 18 may be connected to the controller C through wires or remote-control devices.

Referring to FIG. 5, the trajectory T includes a first segment 54 between the source position 30 and the deflecting surface D and a second segment 56 between the deflecting surface D and the target position 32. By adjusting the orientation of the directional audio, a trajectory T or connection is maintained between the target position 32 and the source position 30 regardless of the respective motion of the target position 32 and the source position 30. The trajectory T need not remain identical over time. Thus, the deflecting point 58 on the deflecting surface D may shift over time as the source position 30 and target position 32 shift over time.

The deflecting surface D is selected to have relatively high internal reflection properties. In some embodiments, the deflecting surface D is composed of glass. The travel points may be updated based on an H point as the vehicle seat 26 moves through the valid three-dimensional limiting space in which movement is possible. The H-point is generally taken to be the intersection of the torso and thigh segments of an occupant.

In one embodiment, the controller C is embedded in the vehicle 12. If the vehicle 12 is part of a fleet, the controller C may be embedded in a master or leader vehicle. In another embodiment, the controller C may be hosted or based out of a remotely located cloud computing service 60. The cloud computing service 60 may include one or more remote servers hosted on the Internet to store, manage, and process data. The cloud computing service 60 may be at least partially managed by personnel at various locations.

Referring to FIG. 1, the vehicle 12 may include a telematics module 62 for establishing two-way communications between the controller C and the cloud computing service 60. The telematics module 62 may collect transmission data from the audio unit 14 and telemetry data, such as location, speed, engine data, maintenance requirements and servicing, by interfacing with various internal sub-systems. The telematics module 62 may enable vehicle-to-vehicle (V2V) communication and/or a vehicle-to-everything (V2X) communication.

The system 10 may employ a wireless network 64 for communications between the vehicle 12 and the cloud computing service 60, shown in FIG. 1. The wireless network 64 may be a short-range network or a long-range network. The wireless network 64 may be a communication BUS, which may be in the form of a serial Controller Area Network (CAN-BUS).

The wireless network 64 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 64 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

In summary, an effective way of boosting audio performance is disclosed for a vehicle 12. The method 200 enables a spatial audio representation when a packaging location for a speaker from a specific direction is not available. A source position 30 (see FIG. 2) is utilized to orient a speaker 16 using a stabilizer 18 to direct audio transmission off of a deflecting surface D (e.g., roof 20) to a target position 32. The system 10 is beneficial in many instances, including providing an occupant 24 with an experience that mimics the three-dimensional spatial audio achieved when speakers may be positioned in the intended directional location. The system 10 provides a flexible location of sound origination to the occupant 24 that is not fixed to a certain location or fixed user position.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for transmitting an audio signal in a vehicle, the system comprising:

a stabilizer located at a source position in the vehicle;

at least one speaker adapted to transmit an audio signal for at least partially supporting a spatial audio representation, the at least one speaker being operatively connected to the stabilizer;

wherein the stabilizer is adapted to direct the audio signal to a target position such that a trajectory between the target position and the source position is maintained regardless of respective motion of the target position and the source position, the target position and the source position being independently movable; and wherein the trajectory includes a first segment between the source position and a deflecting surface and a second segment between the deflecting surface and the target position.

2. The system of claim 1, further comprising:

a controller adapted to identify the target position via execution of an occupant monitoring algorithm, the controller having a processor and tangible, non-transitory memory on which instructions are recorded.

3. The system of claim 1, further comprising:

a controller adapted to determine respective range of motion envelopes for the source position and the target position, the controller having a processor and tangible, non-transitory memory on which instructions are recorded; and wherein the stabilizer is oriented to connect the source position and the target position based on a respective calibrated position of the source position and the target position in the respective range of motion envelopes.

4. The system of claim 1, wherein the source position is located in a vehicle seat.

5. The system of claim 4, wherein the vehicle seat includes a head restraint, the source position being in the head restraint.

6. The system of claim 1, wherein the deflecting surface is a roof of the vehicle.

7. The system of claim 1, wherein the deflecting surface is a window of the vehicle.

8. The system of claim 1, wherein the deflecting surface is at least partially composed of glass.

9. The system of claim 1, wherein the stabilizer is a three-axis gimbal adapted to counteract motion in three directions.

10. The system of claim 9, wherein the three-axis gimbal includes a frame, a plurality of motors and a mounting plate for attachment to the at least one speaker.

11. The system of claim 9, wherein the three-axis gimbal includes one or more vibration ball dampeners adapted to absorb shock along the three directions.

12. A method of transmitting an audio signal in a vehicle, the method comprising:

operatively connecting at least one speaker to a stabilizer, the stabilizer being placed at a source position in the vehicle, the at least one speaker being adapted to transmit an audio signal for at least partially supporting a spatial audio representation;

identifying a target position for receiving the audio signal, the target position and the source position being independently movable, the stabilizer being adapted to direct the audio signal towards the target position such that a trajectory between the target position and the source position is maintained regardless of respective motion of the target position and the source position; and devising the trajectory to include a first segment between the source position and a deflecting surface and a second segment between the deflecting surface and the target position.

13. The method of claim 12, further comprising:

identifying the target position, via execution of an occupant monitoring algorithm by a controller having a processor and tangible, non-transitory memory on which instructions are recorded.

14. The method of claim 12, further comprising:

determining respective range of motion envelopes for the source position and the target position, via a controller having a processor and tangible, non-transitory memory on which instructions are recorded; and adjusting an orientation of the stabilizer to connect the source position and the target position based on the source position and the target position in the respective range of motion envelopes.

15. The method of claim 12, further comprising:

selecting the source position to be in a vehicle seat.

16. The method of claim 15, further comprising:

selecting the source position to be in a head restraint of the vehicle seat.

17. The method of claim 12, further comprising:

selecting the deflecting surface to be a roof or a window of the vehicle.

18. The method of claim 17, further comprising:

selecting the deflecting surface to be at least partially composed of glass.

19. The method of claim 12, further comprising:

selecting the stabilizer to be a three-axis gimbal adapted to counteract motion in three directions.

20. A system for transmitting an audio signal in a vehicle, the system comprising:

a stabilizer located at a source position in a vehicle seat, the stabilizer including a three-axis gimbal adapted to counteract motion in three directions;

at least one speaker adapted to transmit an audio signal for at least partially supporting a spatial audio representation, the at least one speaker being operatively connected to the stabilizer;

wherein the stabilizer is adapted to direct the audio signal to a target position such that a trajectory between the target position and the source position is maintained regardless of respective motion of the target position and the source position, the target position and the source position being independently movable;

wherein the trajectory includes a first segment between the source position and a deflecting surface and a second segment between the deflecting surface and the target position; and wherein the deflecting surface is a roof or a window of the vehicle.

* * * * *